Aug. 22, 1944.  P. DANIELSSON  2,356,655
MACHINE FOR COLLECTING FISH
Filed July 6, 1942  6 Sheets-Sheet 4
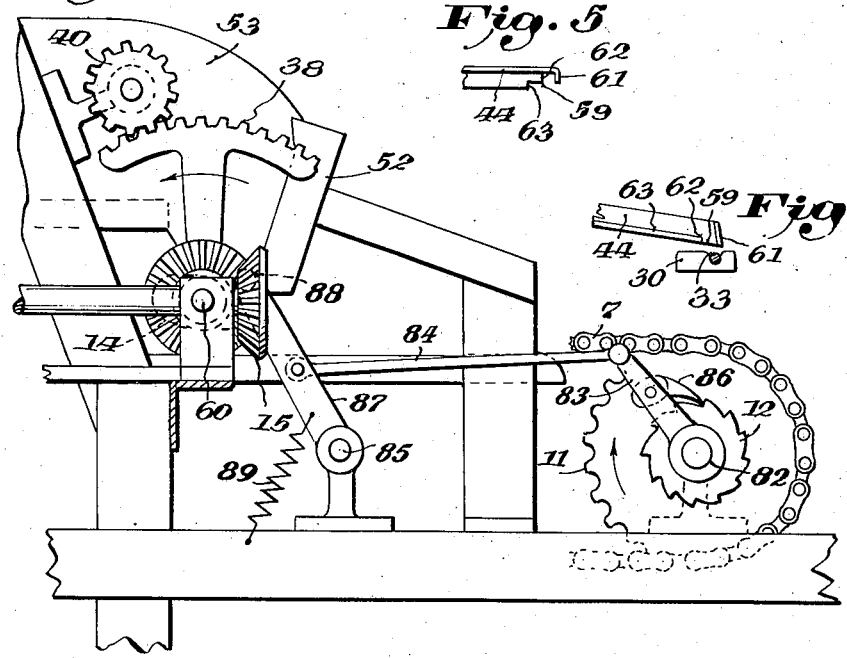
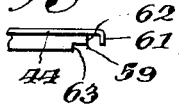
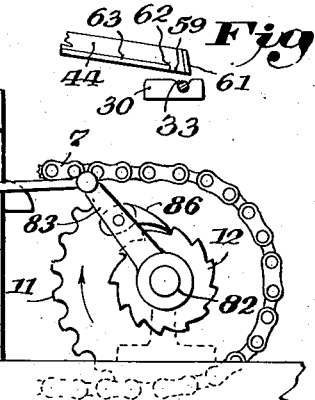
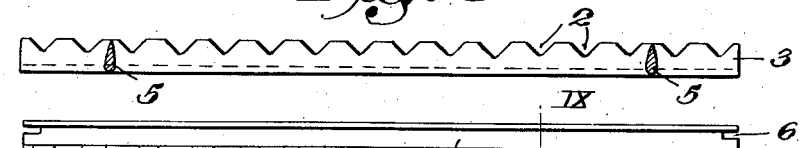
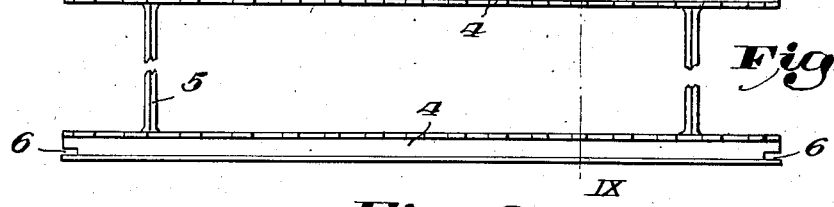
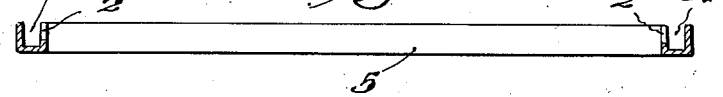
Inventor
Paul Danielsson,
By Sommers Young
Attorneys

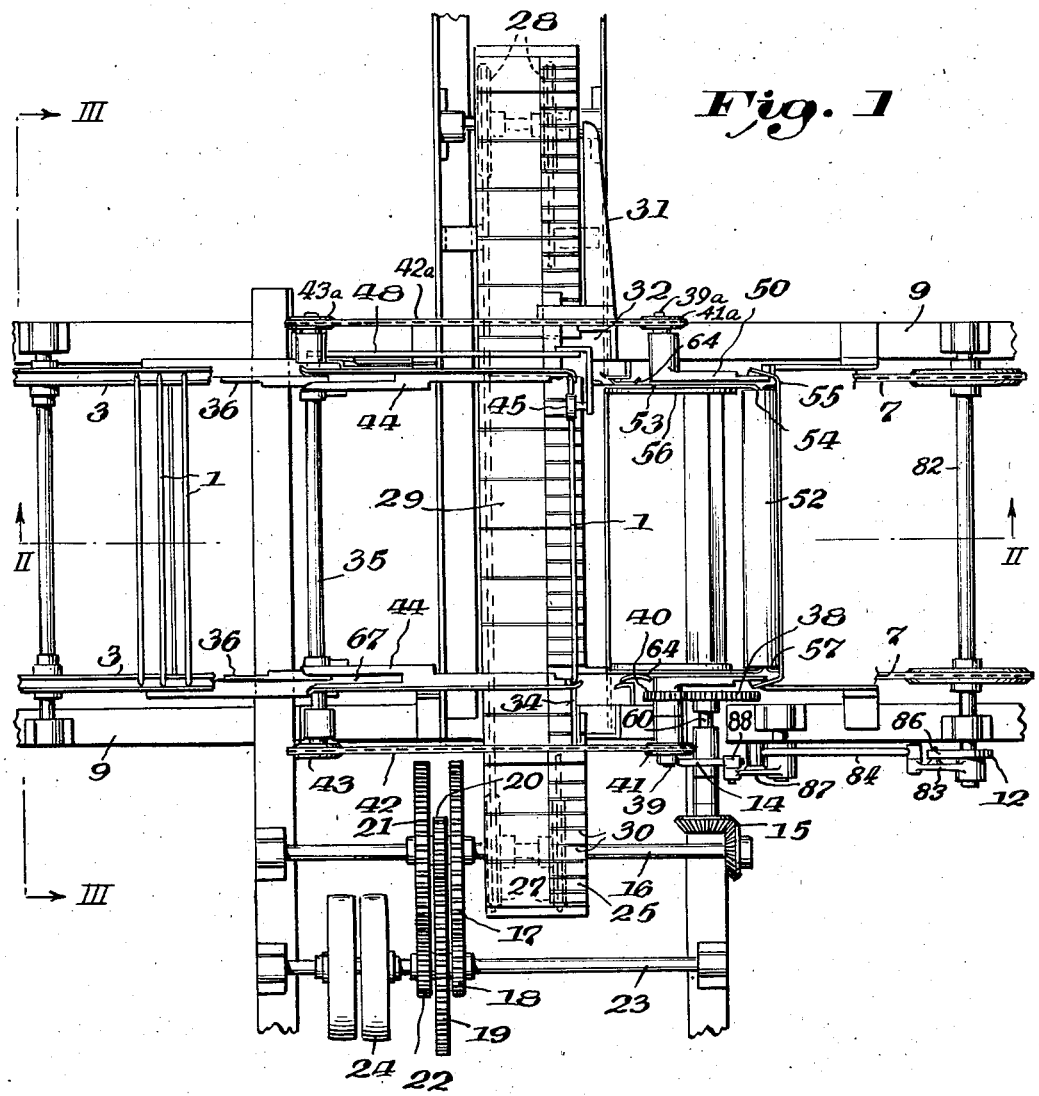

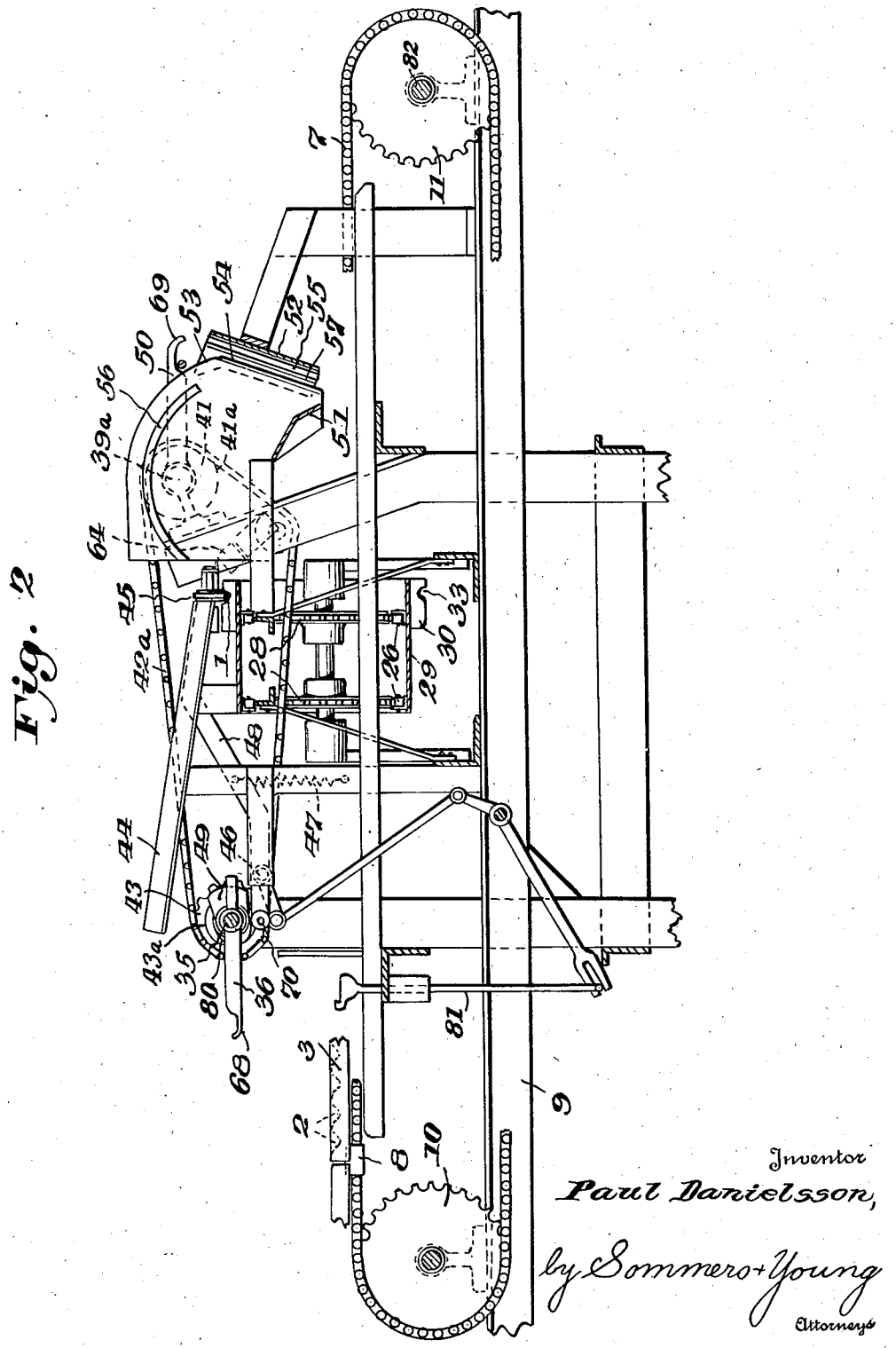

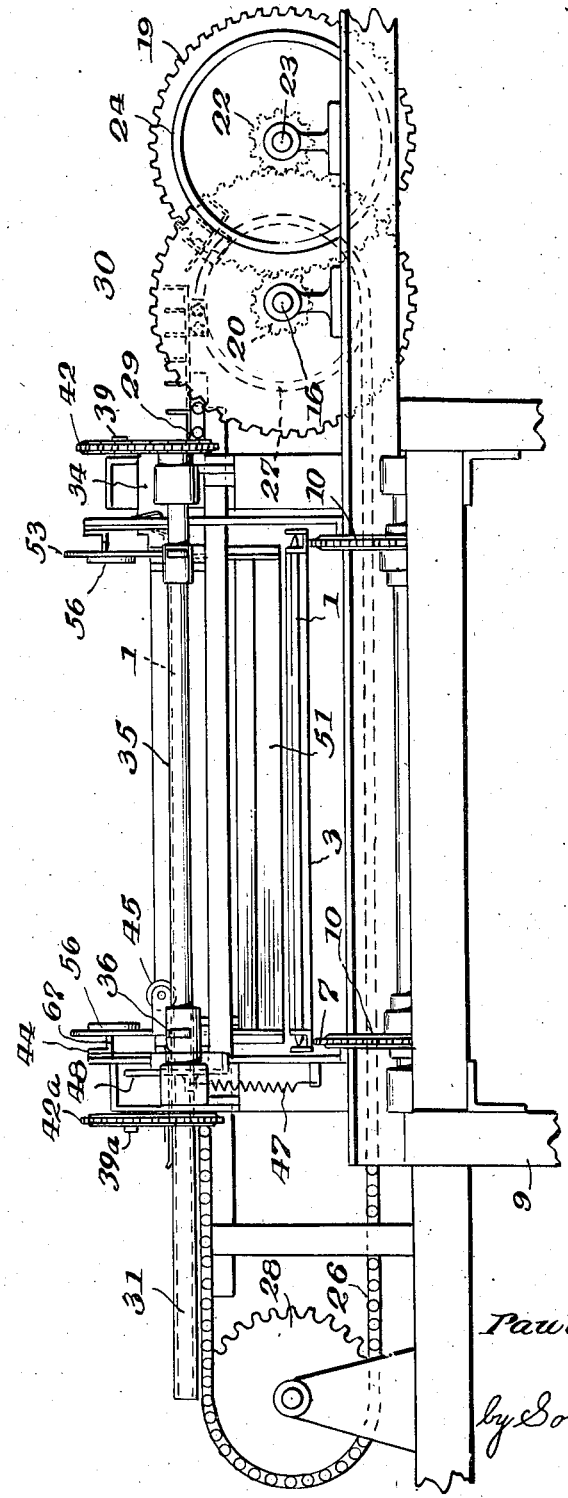

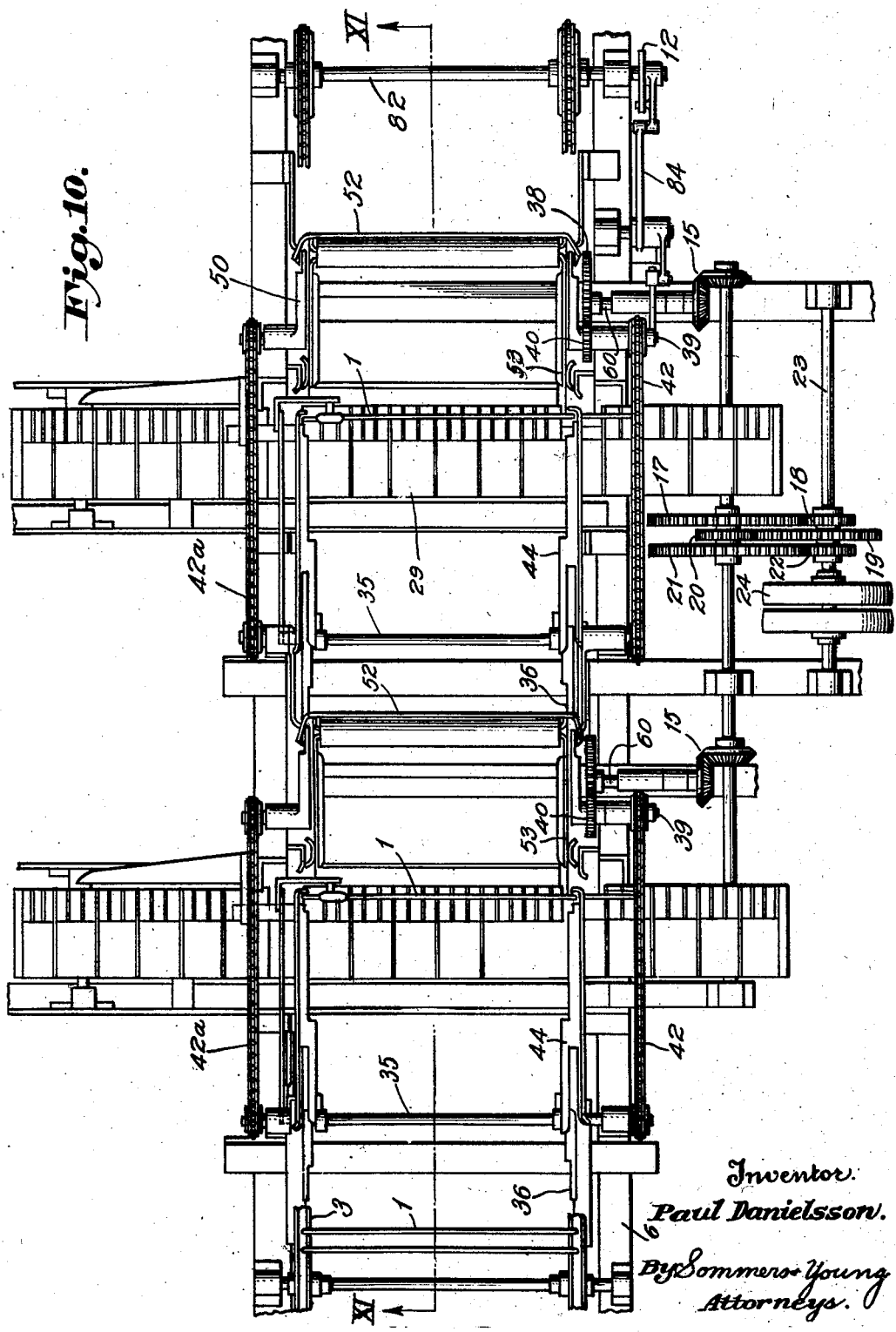

Aug. 22, 1944.  P. DANIELSSON  2,356,655
MACHINE FOR COLLECTING FISH
Filed July 6, 1942  6 Sheets-Sheet 6

Inventor
Paul Danielsson.
By Sommers • Young
Attorneys

Patented Aug. 22, 1944

2,356,655

UNITED STATES PATENT OFFICE 2,356,655

MACHINE FOR COLLECTING FISH

Paul Danielsson, Stockholm, Sweden, assignor to Arenco Aktiebolag, a Swedish joint-stock company Application July 6, 1942, Serial No. 449,943
In Sweden July 4, 1941

7 Claims. (Cl. 17—2)

(Granted under the provision of sec. 14, act of March 2, 1927; 357 O. G. 5)

This invention relates to the collecting of fish by threading series of the fish on to spits for further treatment, and it is an object of the invention to provide a machine for the purpose referred to in the operation of which the fish, for instance herrings, will rapidly, easily and safely be collected in rows on spits for further treatment, such as kippering.

Other objects, uses, advantages and adaptations of the invention will become apparent to those skilled in the art from the following detailed description of one preferred embodiment of a complete machine, shown in the appended drawings for purposes of illustration. In such drawings:

Fig. 1 is a plan view of the machine.

Fig. 2 is a vertical sectional view on the line II—II of Fig. 1.

Fig. 3 is an elevational view of the machine in the direction III—III of Fig. 1.

Fig. 4 is an elevational side view on an enlarged scale of the right hand part of the machine shown in Fig. 2, some parts being omitted.

Figs. 5 and 6 are a plan view and a side view on an enlarged scale of a part of the machine.

Figs. 7 and 8 are a plan view and a side view on an enlarged scale, illustrating a frame for supporting the spits when advanced through the machine.

Fig. 9 is a sectional view on the line IX—IX of Fig. 7.

Fig. 10 is a plan view on a smaller scale of a modified embodiment of the machine.

Figure 11:
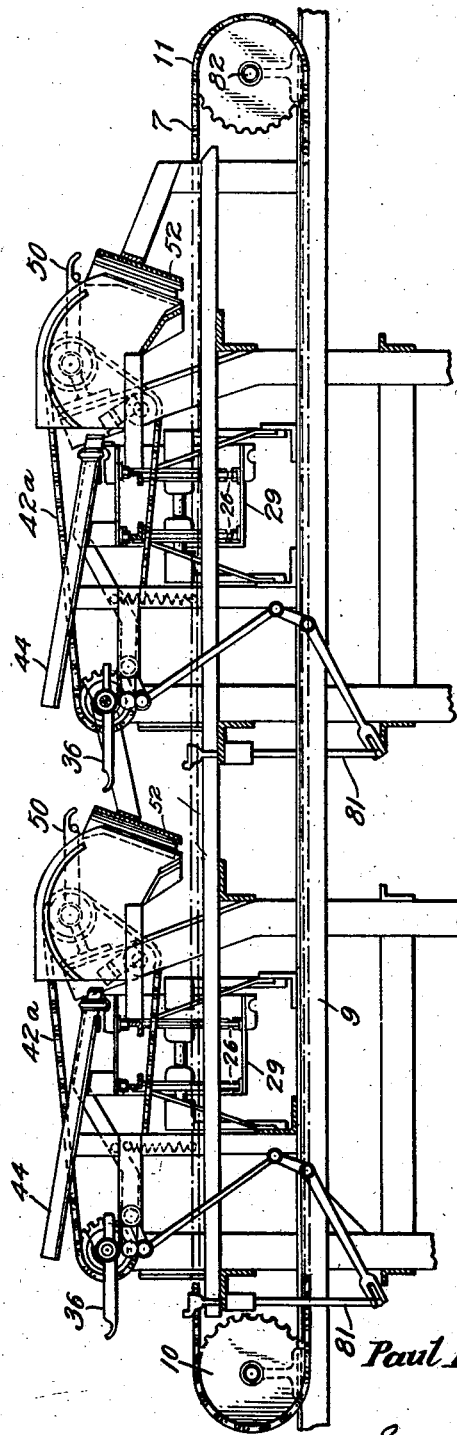
Fig. 11 is a vertical sectional view on a still smaller scale, taken on the line XI—XI of Fig. 10.

Referring to the drawings, the fish, for instance herrings, are to be threaded on to spits 1, which penetrate the fish when the latter are successively advanced laterally by a conveyor 26. The spits 1 are loosely supported in recesses 2 of frames 3. Each frame 3 consists of two parallel longitudinal bars 4 which have U-shaped cross section, so that they have longitudinal grooves 37. The recesses 2 are provided in the inner ribs of the longitudinally grooved bars 4, which are interconnected by cross bars 5. At their ends the bars 4 have notches 6, into which fit impellers 8 on a conveyor 7 for feeding the frames 3 through the machine. The distance between the bars 4, i. e., between their inner ribs, is less than the length of the spits 1, but the distance between the outer ribs is slightly greater than said length, so that the spits will rest upon the inner ribs of the bars only.

The frames 3 are conveyed closely in succession through the machine by the chain conveyor 7 having the impellers 8, which fit into the notches 6. The conveyor 7 consists of two parallel chains, each of which runs over a sprocket 10 loosely journalled in the machine frame 9 and over another sprocket 11 that is secured to a rotary shaft 82 which is rigidly connected to a ratchet wheel 12. The ratchet wheel 12 is turned stepwise by a pawl 86 pivoted to an arm 83 pivotally journalled on the shaft 82. The arm 83 is pivoted to one end of a link 84, the other end of which is pivoted to an arm 87 which is pivotally journalled on a shaft 85 and provided with a roller 88 which, by a spring 89 connected to the arm 87, is urged against a cam disc 14 which is secured to a shaft 60 driven by means of a bevel gearing 15. One wheel of the bevel gearing 15 is secured to a rotatable shaft 16, to which is secured a gear wheel 17 which is driven by a smaller gear wheel 18 that is loosely mounted on a shaft 23. The gear wheel 18 is rigidly connected to a larger gear wheel 19, which meshes with a smaller gear wheel 20, which is rigidly connected to a larger gear wheel 21 that is loosely mounted on the shaft 16. The gear wheel 21 meshes with a smaller gear wheel 22, which is secured to the shaft 23, to which is keyed a belt pulley 24 that is driven by a motor (not shown).

The fish to be threaded onto the spits 1 are advanced laterally, i. e., transversely, by the chain conveyor 26, which runs over two sprocket wheels 27, secured to the shaft 16 and over two idle sprocket wheels 28. The conveyor chain 26 is provided with carrier plates 29, which at one side of the conveyor have each three short pockets 25, separated from each other by partitions 30. The fish are placed belly upwards into the pockets 25, so that their head ends abut against a gauge plate 31, extending longitudinally of the conveyor 26 at one side thereof. The pockets 25 are arranged in groups in such manner that between each group of carrier plates 29 (six, for instance) having pockets there is a plate having no pockets, as its corresponding end is cut away at 32.

Each step of movement of the conveyor 7 corresponds to the distance between two juxtaposed spits 1, resting in a frame 3 on said conveyor. After each step of movement of the spit conveyor 7 a spit 1 is removed from the frame 3 and transferred transversely to the fish conveyor 26 into a position longitudinally thereof, in which position it rests in a support formed by recesses 33 in the partitions or impellers 30 of the fish conveyor. In order to prevent longitudinal displacement of the spit 1 thus resting upon the conveyor partitions 30, one end of the spit 1 rests against a stationary abutment 34. The transfer of the spits 1 to the conveyor 26 is performed by means of two arms 36 secured to a rotary shaft 35. The arms 36 have at their free ends curved fingers 68 and are periodically turned through the grooves 37 of the frame 3. The arms 36 are turned stepwise through one revolution by a gear segment 38, secured to the shaft 60. For that purpose, the gear segment 38 is periodically caused to mesh with a pinion 40, secured to a shaft 39. To the shaft 39 is also secured a sprocket 41, which by means of a chain 42 drives another sprocket 43, secured to the shaft 35. When the arms 36 have elevated a spit from the frame 3 into a certain level the spit drops out of the arms onto a pair of sloping races formed by bars 44 having L-shaped cross sections. The spit 1 rolls upon the inwardly directed rims of said bars 44 down into the recesses 33 of the conveyor partitions 30. In the inwardly directed rim the L-shaped bars 44 have at their front ends, i. e., lower ends, a stepped recess 59 (Figs. 5 and 6) at the front end of which there is an inwardly curved end 61 of the vertical rim of the bar. As shown in Fig. 6, the end 61 of the bar is located so that the stepped recesses 59 of the bars 44 are positioned above the recesses 33 of the conveyor partitions 30. The spit 1 rolling upon the bars 44 drops through the recess 59 in front of the edge 62 (Fig. 5), and thus it is by the fingers 61 guided into the recesses 33. At their rear ends, the bars 44 have notches 67 through which the arms 36 can pass when they, after having delivered a spit to the conveyor 26, are turned downwards. The end of the spit 1, onto which the fish is threaded by the conveyor 26, is retained within the recesses 33 by a roller 45 which is rotatably journalled on an arm 48 pivoted on a pin 46 and connected to a spring 47 that urges the roller 45 against the spit end and prevents deviation of said end when the fish are threaded onto same. When the fish slides upon the spit 1 the roller 45 yields upwardly allowing the fish to be moved by the conveyor upon the spit. The rear end of the arm 48 has a roller 70, which is periodically actuated by a cam 49, secured to the shaft 35, so that the roller 45 is elevated simultaneously as the arms 36 deliver a spit 1 to the bars 44. The cam 49 retains the roller 45 in its elevated position until the spit 1 has rolled down into the recesses 33 of the conveyor partitions 30, whereafter the spring 47 again turns the arm 48 and roller 45 down into the position shown in the drawings. The roller 45 will prevent the spit end from being elevated, even though relatively large fish are threaded onto the spit 1. In the embodiment as illustrated the fish conveyor 26 is adapted to thread eighteen fishes onto the spit 1, before it is removed and replaced by an empty spit. When being replaced, i. e., after the roller 45 has been elevated, the filled spit 1 is elevated by two arms 50 that are secured to the rotatable shafts 39 and 39a and have at their free ends curved fingers 69. The upper arm 50 of Fig. 1 is secured to a rotatable shaft 39a, to which is secured a sprocket 41a. The sprocket 41a is driven by a chain 42a and sprocket 43a secured to the shaft 35. By turning the shafts 39 and 39a the arms 50 are swung so that their fingers 69 are moved upwards and catch the spit and elevate the same out of the recesses 33 of the conveyor 26. On their continued movement upwards the fingers 69 together with the spit are moved through the openings 59 in front of the edges 63 of the bars 44 and catch the spit and elevate the same out of the recesses 33 of the conveyor 26. Then the row of fish is hanging vertically on the spit, which is moved by the arms 50 into the position shown in Fig. 2, wherefrom it drops onto a frame 3 on the conveyor 7. When the arms 50 move upwards to remove a filled spit 1 from the conveyor 26 a group of conveyor pockets 25 is in position exactly above the conveyor 7, so that the arms 50 can pass through the conveyor 26 in front of two recessed plates 29, as shown in Fig. 1. On its removal the spit 1 is by the arms 50 moved transversely over two lateral vertical plates 53, between which the row of fish is hanging down. In order to prevent the caudal fins of the two outermost fishes of the row from engaging the plates 53, the latter have on their inner surfaces curved guide rims 56 the curvature of which is such that the vertical distance between the rim 56 and the path of movement of the spit 1 is invariable. Therefore the two outermost fishes of the row will constantly contact the guide rims 56 at a definite distance from the ends of the spits. When the arms 50 have been turned into the position shown in Fig. 2 the spit 1 drops into a guide between two screens 51 and 52. Thus, the ends of the spit are guided between front edges 54 of the plates 53 and edges 57 of two bars 55 secured to the screen 52, so that the spit drops into the recesses 2 of a frame 3 that has previously delivered empty spits for filling with fish and thereafter by the conveyor 7 has been advanced further transversely to and below the fish conveyor 26, immediately followed by another frame 3 carrying empty spits. In order also to prevent the caudal fins of the two outermost fishes from contacting the conveyor 7 the edges 54 of the plates 53 as well as the bottom ends of the bars 55 are curved slightly inwards. When the gear segment 38 has passed the pinion 40 the arms 50, when moving upwards, have just passed a pair of blade springs 64 that serve as latches to prevent the arms from moving back from that position of rest. After the foremost stepwise advancing frame 3 on the conveyor 7 has been completely loaded with filled spits it is removed from the front end of the conveyor 7 and introduced into a device to kipper the fish when hanging on the spits. Simultaneously another frame filled with empty spits is placed onto the rear end of the conveyor 7 to be advanced stepwise and deliver spits to the conveyor 26, whereafter it is moved further to receive from said conveyor spits delivered by a subsequent frame and filled with fish.

Instead of being equipped with a single fish conveyor 26 as well as means for delivery and removal of spits the machine may have a plurality of juxtaposed conveyors for advancing the fish laterally to a single frame conveyor 7 extending transversely of the fish conveyors. In such case, the length of the conveyor 7 has to be increased correspondingly. In this arrangement, the conveyor 7 will at each step of movement advance two, three or still more spits, and each separate conveyor 26 will receive from the frame 3 one of said spits to be filled in the manner previously described and all the spits will thereafter be transferred to one and the same frame 3 on the conveyor 7. The several fish conveyors and implements juxtaposed transversely to the frame conveyor 7 may be developed as those previously described with reference to the drawings and adapted to be easily mounted as a unit on the machine and removed therefrom at will. Thus, if the length of the frame conveyor 7 is sufficient, the capacity of the machine can be adjusted by variation of the number of fish collecting units cooperating with the frame conveyor. If from each frame every other, every third, etc., of the spits is to be transferred by the arms 36 of each unit said spits might be elevated slightly to be presented to the arms 36 cooperating with the one of the conveyors 26 that has to receive the spit in question. This can be effected by means of pins 81 that are periodically moved upwards by cams 80 secured to the shaft 35. In Figs. 10 and 11 such an arrangement is shown in which two fish conveyors 26 and implements belonging thereto driven by a joint shaft 16 cooperate with the conveyor 7.

I claim:

1. A fish collecting machine having a conveyor for feeding the fish transversely, means for supporting a spit longitudinally of the fish feeding direction to receive fish successively advanced and threaded by said conveyor on to said spit, and means for successively supplying said supporting means with empty spits and for successively removing filled spits from said supporting means.

2. A fish collecting machine having a conveyor for feeding the fish transversely, means for supporting a spit longitudinally of the fish feeding direction to receive fish successively advanced and threaded by said conveyor on to said spit, another conveyor extending transversely to the fish feeding direction and adapted to convey spits transversely, means operative at one side of said fish conveyor for successively transferring empty spits from said spit conveyor to said supporting means, and means operative at the other side of said fish conveyor for successively transferring filled spits from said supporting means to said spit conveyor.

3. A fish collecting machine having a conveyor provided with impellers for feeding the fish transversely, said impellers being recessed to receive and support a spit placed longitudinally of the fish feeding direction to receive fish successively advanced and threaded by said conveyor on to said spit, and means for successively supplying said conveyor with empty spits and for successively removing filled spits from said conveyor.

4. A fish collecting machine having a conveyor for feeding the fish transversely, means for supporting a spit longitudinally of the fish feeding direction to receive fish successively advanced and threaded by said conveyor on to said spit, means or successively supplying said supporting means with empty spits and for successively removing filled spits from said supporting means, a holder for preventing transversal deviations of the spits when placed into fish receiving position, and means for periodically opening said holder to allow transversal introduction of a spit into said supporting means.

5. A fish collecting machine having a conveyor for feeding the fish transversely, means for supporting a spit longitudinally of the fish feeding direction to receive fish successively advanced and threaded by said conveyor on to said spit, means for successively supplying said supporting means with empty spits and for successively removing filled spits from said supporting means, said spit supplying means having a pair of arms, a pair of rolling races sloping towards said spit supporting means, and means to swing said arms to successively deliver spits to said race.

6. A fish collecting machine having a conveyor for feeding the fish transversely, means for supporting a spit longitudinally of the fish feeding direction to receive fish successively advanced and threaded by said conveyor on to said spit, means for successively supplying said supporting means with empty spits and for successively removing filled spits from said supporting means, said spit removing means comprising a spit conveyor, a pair of arms, means to swing said arms to periodically transfer a spit from said supporting means to said spit conveyor.

7. A fish collecting machine having a plurality of juxtaposed conveyors for feeding the fish transversely, a means at each fish conveyor for supporting a spit longitudinally of the fish feeding direction to receive fish successively advanced and threaded by the conveyor on to the spit, another conveyor extending transversely to the fish feeding direction, means operative at one side of each fish conveyor for transferring empty spits from said spit conveyor to said fish conveyors, means for selecting from said spit conveyor spits to be transferred to the several conveyors, and means for transferring filled spits from said supporting means to said spit conveyor.

PAUL DANIELSSON.